(12) United States Patent
Kwon et al.

(10) Patent No.: US 10,897,625 B2
(45) Date of Patent: Jan. 19, 2021

(54) BLOCK ARTIFACT SUPPRESSION IN VIDEO CODING

(71) Applicant: Texas Instruments Incorporated, Dallas, TX (US)

(72) Inventors: Do-Kyoung Kwon, Allen, TX (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 552 days.

(21) Appl. No.: 13/869,253

(22) Filed: Apr. 24, 2013

(65) Prior Publication Data

US 2013/0287099 A1    Oct. 31, 2013
US 2017/0289540 A9    Oct. 5, 2017

Related U.S. Application Data

(63) Continuation-in-part of application No. 13/093,715, filed on Apr. 25, 2011, now abandoned, and a continuation-in-part of application No. 12/951,035, filed on Nov. 20, 2010, now Pat. No. 8,817,884.

(60) Provisional application No. 61/638,248, filed on Apr. 25, 2012, provisional application No. 61/642,002, filed on May 3, 2012, provisional application No. 61/331,216, filed on May 4, 2010, provisional (Continued)

(51) Int. Cl.
| | |
|---|---|
| *H04N 19/20* | (2014.01) |
| *H04N 19/157* | (2014.01) |
| *H04N 19/176* | (2014.01) |
| *H04N 19/86* | (2014.01) |
| *H04N 19/14* | (2014.01) |
| *H04N 19/126* | (2014.01) |

(52) U.S. Cl.
CPC .......... *H04N 19/20* (2014.11); *H04N 19/126* (2014.11); *H04N 19/14* (2014.11); *H04N 19/157* (2014.11); *H04N 19/176* (2014.11); *H04N 19/86* (2014.11)

(58) Field of Classification Search
CPC .. H04N 19/102; H04N 19/124; H04N 19/126; H04N 19/176; H04N 19/14; H04N 19/157; H04N 19/20; H04N 19/86
USPC ................................................... 375/240.03
See application file for complete search history.

(56) References Cited

U.S. PATENT DOCUMENTS

2002/0181583 A1* 12/2002 Corbera ............... H04N 19/176
                                                                                         375/240.03
2006/0034532 A1* 2/2006 Govindaswamy ...... G06T 9/005
                                                                                         382/240

(Continued)

OTHER PUBLICATIONS

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

(Continued)

*Primary Examiner* — Farzana Hossain
(74) *Attorney, Agent, or Firm* — Ebby Abraham; Charles A. Brill; Frank D. Cimino

(57) ABSTRACT

A method for encoding a video sequence in a video encoder is provided that includes adapting a quantization parameter of a block of pixels in a picture of the video sequence based on a transform block size of the block of pixels to determine a final quantization parameter, and quantizing transform coefficients of the block of pixels using the final quantization parameter.

9 Claims, 4 Drawing Sheets

Related U.S. Application Data application No. 61/431,889, filed on Jan. 12, 2011, provisional application No. 61/469,518, filed on Mar. 30, 2011, provisional application No. 61/262,960, filed on Nov. 20, 2009.

(56) References Cited

U.S. PATENT DOCUMENTS

| | | | | |
|---|---|---|---|---|
| 2008/0192824 | A1* | 8/2008 | Lim | H04N 19/147 375/240.03 |
| 2008/0304562 | A1* | 12/2008 | Chang | H04N 19/159 375/240.03 |
| 2009/0267825 | A1* | 10/2009 | Vetro | G01S 13/90 342/25 R |
| 2010/0061454 | A1* | 3/2010 | Park | H04N 19/176 375/240.12 |
| 2010/0086032 | A1* | 4/2010 | Chen | H04N 19/176 375/240.12 |
| 2011/0122942 | A1* | 5/2011 | Kudana | H04N 19/00175 375/240.03 |
| 2011/0268180 | A1 | 11/2011 | Srinivasamurthy et al. | |
| 2011/0274162 | A1* | 11/2011 | Zhou | H04N 19/176 375/240.03 |
| 2012/0183053 | A1* | 7/2012 | Lu | H04N 19/176 375/240.03 |
| 2017/0289540 | A9* | 10/2017 | Kwon | H04N 19/20 |

OTHER PUBLICATIONS

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-249, Jul. 11-20, 2011, Stockholm, Sweden.

Benjamin Bross et al, "High Efficiency Video Coding (HEVC) Text Specification Draft 7", JCTVC-I1003_d0, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-214, Jul. 14-22, 2011, Torino, Italy.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

"TMS320DM6467 Digital Media System-on-Chip", SPRS403G, Texas Instruments Incorporated, Dec. 2007, revised Oct. 2010, pp. 1-355.

* cited by examiner

BLOCK ARTIFACT SUPPRESSION IN VIDEO CODING

CROSS-REFERENCE TO RELATED APPLICATIONS

This application (U.S. patent application Ser. No. 13/869, 253, filed Apr. 24, 2013) claims benefit to U.S. Provisional Patent Application No. 61/638,248, filed Apr. 25, 2012, and U.S. Provisional Patent Application No. 61/642,002, filed May 3, 2012. This application is also a continuation-in-part of U.S. patent application Ser. No. 13/093,715, filed Apr. 25, 2011, now abandoned, which claims benefit of U.S. Provisional Patent Application No. 61/469,518, filed Mar. 30, 2011, U.S. Provisional Patent Application No. 61/431,889, filed Jan. 12, 2011, and U.S. Provisional Application No. 61/331,216, filed May 4, 2010. This application is also a continuation-in-part of U.S. patent application Ser. No. 12/951,035, filed Nov. 11, 2010, now U.S. Pat. No. 8,817,884, granted Aug. 26, 2014, which claims benefit of U.S. Provisional Patent Application No. 61/262,960, filed Nov. 20, 2009. All of which are incorporated herein by reference in their entirety.

This application may be related to U.S. Patent Application Publication No. 2011/0122942, filed Nov. 20, 2010, which is incorporated herein by reference in its entirety.

BACKGROUND OF THE INVENTION

Field of the Invention

Embodiments of the present invention generally relate to block artifact suppression in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 45% improvement in coding efficiency over the current standard, H.264/AVC, as well as larger resolutions and higher frame rates. The improved coding efficiency is in part due to advanced intra and inter prediction techniques with a large coding unit (LCU) of up to 64×64 in size, large transform units (TU) up to 32×32 in size, rate-distortion optimized quantization, and improved loop filtering including deblocking filtering and sample adaptive offset (SAO), filtering. Even though both objective and subjective quality is significantly improved, some annoying visual artifacts are introduced. One such artifact is strong blockiness around 32×32 TU boundaries when high frequency transform coefficients are coarsely quantized.

SUMMARY

Embodiments of the present invention relate to methods, apparatus, and computer-readable media for block artifact suppression in video coding. In one aspect, a method for encoding a video sequence in a video encoder is provided that includes adapting a quantization parameter of a block of pixels in a picture of the video sequence based on a transform block size of the block of pixels to determine a final quantization parameter, and quantizing transform coefficients of the block of pixels using the final quantization parameter.

In one aspect, an apparatus for encoding a video sequence is provided that includes means for adapting a quantization parameter of a block of pixels in a picture of the video sequence based on a transform block size of the block of pixels to determine a final quantization parameter, and means for quantizing transform coefficients of the block of pixels using the final quantization parameter.

In one aspect, a non-transitory computer readable medium storing software instructions is provided. The software instructions, when executed by a processor, cause a method for encoding a video sequence to be performed that includes adapting a quantization parameter of a block of pixels in a picture of the video sequence based on a transform block size of the block of pixels to determine a final quantization parameter, and quantizing transform coefficients of the block of pixels using the final quantization parameter.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
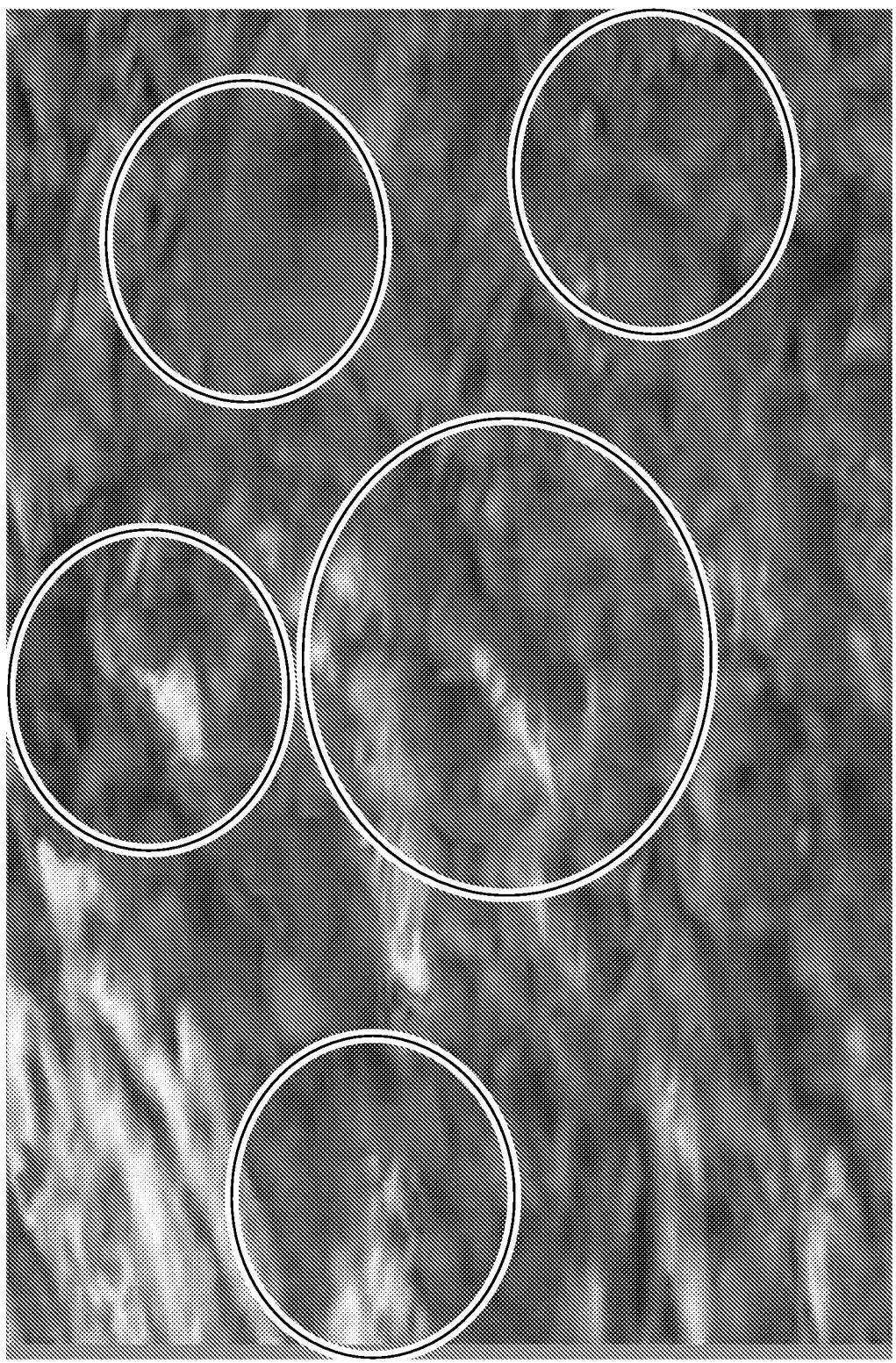
FIG. 1 is an example.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

As used herein, the term 'activity' refers to the extent of variation in the values of pixels contained in a block of video data. Thus, in general, a block with higher 'activity' has greater variation in pixel values, and will have more higher-frequency components (in terms of variation in the pixel values) than low-frequency components. In contrast, a block with lower 'activity' has lesser variation in pixel values, and will have more low-frequency components than high-frequency components.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, July 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-11003_d0, Joint Collaborative Team on Video Coding (JCT-VC) of ITU-T SG16 WP3 and ISO/IEC JTC1/SC29/WG1, Geneva, CH, April 27-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v7, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

As previously discussed, strong block artifacts are observed around 32×32 TU boundaries when high frequency transform coefficients are coarsely quantized. This may occur because coarser quantization for this TU size can increase any discontinuities from neighboring TUs. FIG. 1 is an example illustrating strong blocking artifacts at 32×32 TU boundaries.

One well known way to improve visual quality (and reduce blocking artifacts) that has been used in H.264/AVC is perceptual quantization (sometimes also referred to as adaptive quantization). In perceptual quantization, the quantization parameter (QP) values for blocks in a frame are varied to distribute the noise and artifacts according to masking properties of the human visual system (HVS). The goal is to maximize the visual quality of an encoded video sequence while keeping the bit rate low. For example, according to HVS theory, the human visual system performs texture masking (also called detail dependence, spatial masking or activity masking). That is, the discrimination threshold of the human eye increases with increasing picture detail, making the human eye less sensitive to quantization noise and coding artifacts in busy or highly textured portions of frames and more sensitive in flat or low-textured portions.

During video encoding, this texture masking property of the HVS can be exploited by shaping the quantization noise in the video frame based on the texture content (also referred to as activity) in the different parts of the video frame. More specifically, the quantization step size can be increased in highly textured portions, resulting in coarser quantization and a lower bit rate requirement, and can be decreased in low-textured or flat portions to maintain or improve video quality, resulting in finer quantization but a higher bit rate requirement. The human eye will perceive a "noise-shaped" video frame as having better subjective quality than a video frame which has the same amount of noise evenly distributed throughout the video frame.

Figure 2:
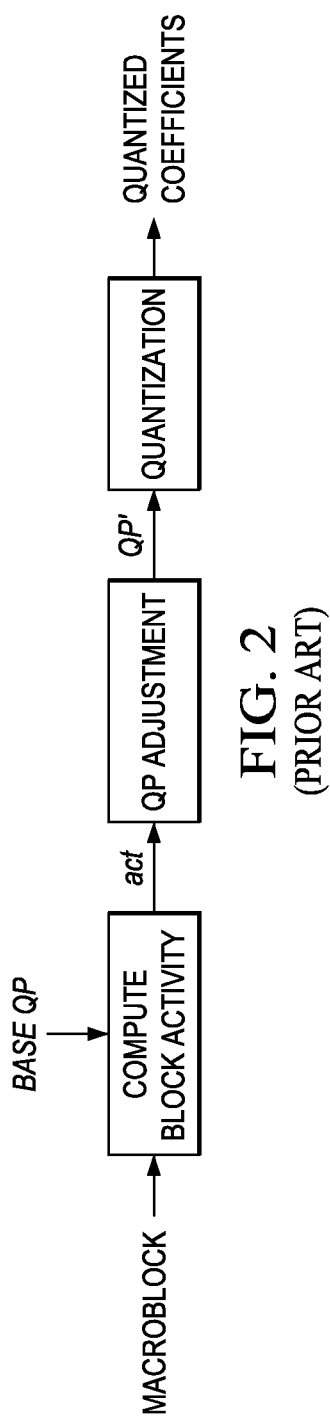
FIG. 2 is a flow diagram of a prior art method for perceptual quantization.

FIG. 2 illustrates a typical prior art technique for perceptual quantization as used in H.264/AVC. For each macroblock, a block activity measure (act) is computed. A decision is then made based on the block activity measure as to whether or not the base quantization parameter (base QP) as determined by rate control for the macroblock is to be changed, and if it is to be changed, by how much. For example, in macroblocks with high activity measures, the base QP may be increased to reduce bit rate as typically coding artifacts are less visible in such complex areas. In macroblocks with low activity measures, which is indicative of a smooth area in which coding artifacts may be more visible, the base QP may be reduced to improve visual quality. U.S. Pat. App. Pub. No. 2011/0122942 describes various embodiments of this prior technique for perceptual quantization, along with various methods for measuring macroblock activity and modulating base QP based on the measured activity.

Embodiments of the invention provide for perceptual quantization that determines quantization parameters for coding units based both on CU activity measures and transform unit (TU) size. More specifically, for a CU with the largest TU size, e.g., 32×32, the base quantization parameter may be modulated (adapted) based on activity measured in the CU and based on the TU size. Consideration of the TU size allows the QP for CUs having the largest TU size, e.g., 32×32, to be decreased (made less coarse) to suppress discontinuities from neighboring CUs and thus decrease blocking artifacts.

Figure 3:
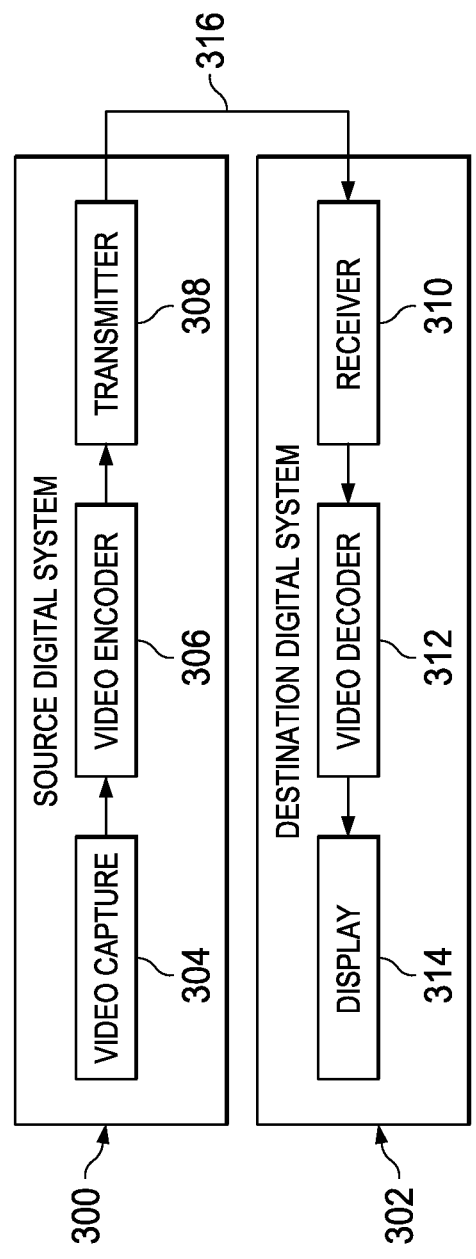
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform a method for determining quantization parameters based on transform unit size during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video streaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
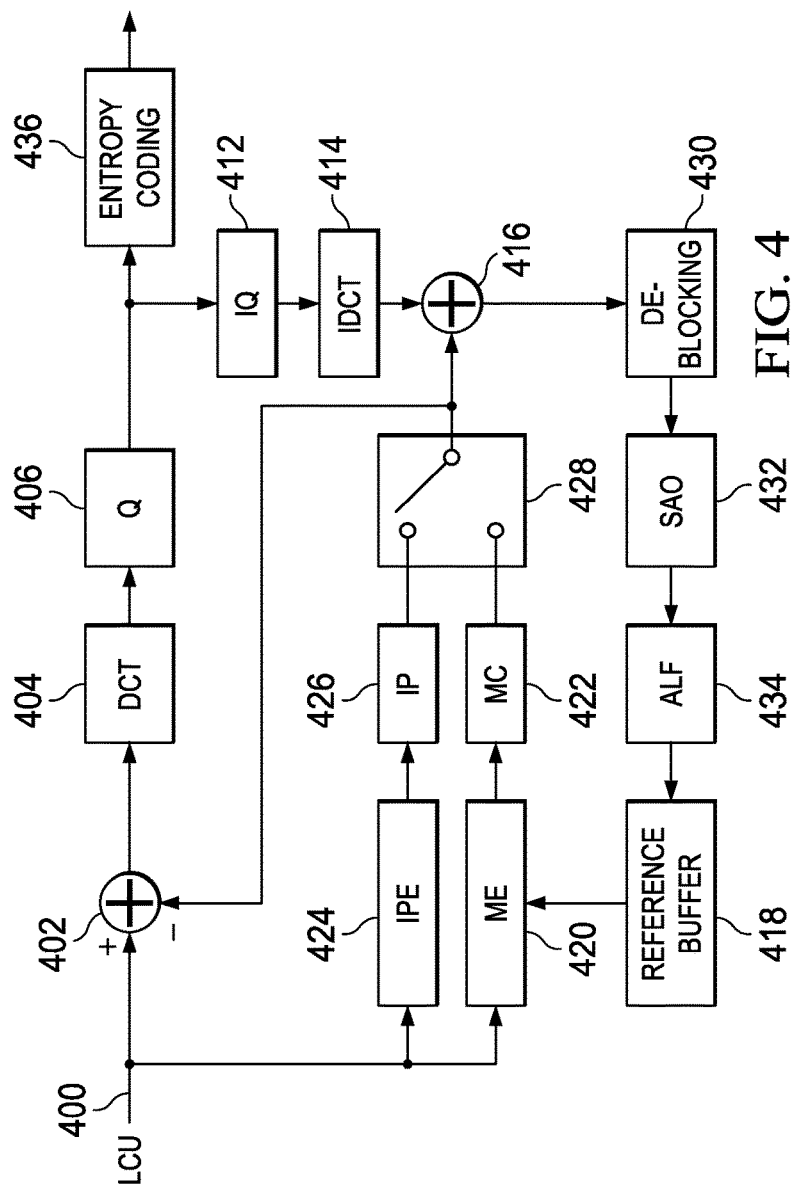
FIG. 4 is a block diagram of a video encoder.

FIG. 4 is a block diagram of the LCU processing portion of an example video encoder, e.g., the video encoder component of FIG. 3, with functionality to determine quantization parameters for CUs based on TU size in the CU. An input digital video sequence is provided to a coding control component (not shown), e.g., from a video capture component 304 (see FIG. 3). The coding control component sequences the various operations of the video encoder, i.e., the coding control component runs the main control loop for video encoding. For example, the coding control component performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The coding control component includes functionality to perform rate control for generation of the compressed bit stream. As part of rate control, the coding control component generates base quantization parameters (base QPs) to be used for quantization of the transform coefficients of coding units. Any suitable technique for rate control may be used. As is explained in more detail herein, the quantization component 406 may adapt the base quantization parameter based on activity (texture) measured in a CU and on TU size in the CU.

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantization component 406. More specifically, the transform component 404 receives the transform unit sizes for the residual CU and applies transforms of the specified sizes to the CU to generate transform coefficients. Further, the quantization component 406 quantizes the transform coefficients based on base quantization parameters (base QPs) provided by the coding control component and the transform sizes and provides the quantized transform coefficients to the entropy coding component 436 for coding in the bit stream. To determine the actual quantization parameter for a CU, the quantization component 406 may adapt (modulate) the base QP based on activity (texture) in the CU and based on the TU size used for the CU. A method for modulating base QP based on activity and TU size that may be performed by the quantization component 406 is described herein in reference to FIG. 5.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, quantization information, and the quantized transform coefficients for the CUs. The entropy coding component 436 also codes relevant data from the in-loop filters (described below).

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures and to compute checksums to be included in hash SEI message in the compressed bit stream.

The quantized transform coefficients for each CU are provided to an inverse quantization component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter component 430, a sample adaptive offset filter (SAO) component 432, and an adaptive loop filter (ALF) component 434. The in-loop filters 430, 432, 434 are applied to each reconstructed LCU in the picture and the final filtered reference picture data is provided to the storage component 418. In some embodiments, the ALF filter component 434 may not be present.

Figure 5:
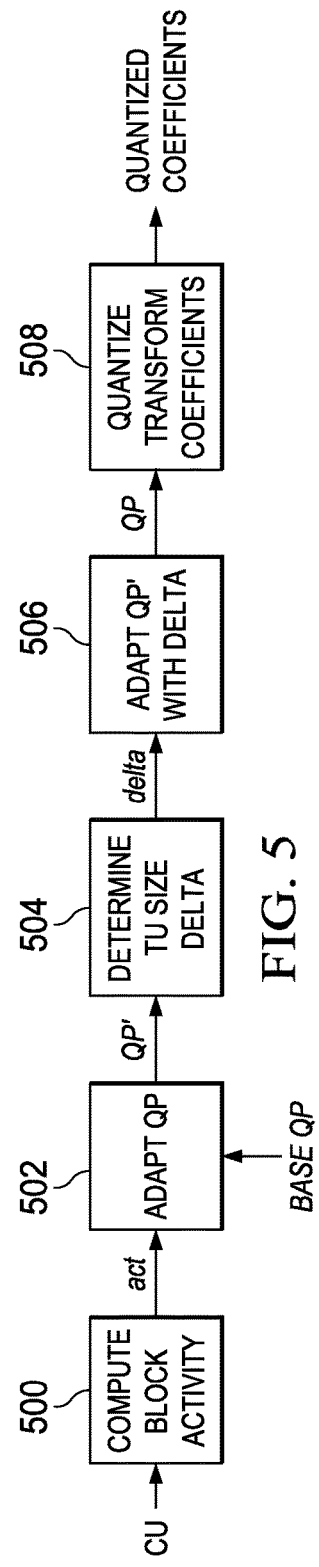
FIG. 5 is a flow diagram of a method.

FIG. 5 is a flow diagram of a method for adaptive quantization in which a base quantization parameter (base QP) for a coding unit is adapted (modulated) based on measured activity in the CU and based on TU size in the CU. This method may be performed, for example, by the quantization component 406 of FIG. 4. Initially, an activity measure for the coding unit is computed 500. The activity measure may be representative of the degree of sensitivity of the human visual system to information in the CU, i.e., may be representative of amount of texture in the CU. Any suitable technique for computing the activity measure may be used. Some suitable techniques that may are described in U.S. Pat. App. Pub. No. 2011/0122942.

The base QP for the CU is then adapted 502 to QP' based on the computed activity measure. In general, if the activity measure indicates that the amount of activity in the block is high, the base QP is increased by some amount to reduce bit rate as typically coding artifacts are less visible in more complex areas. Further, if the activity measure indicates that the amount of activity in the block is low, the base QP is decreased by some amount to improve visual quality as coding artifacts may be more visible in smoother areas. Any suitable technique for adapting the base QP based on the activity measure may be used. Some suitable techniques that may be used are described in U.S. Pat. App. Pub. No. 2011/0122942. Note that the base QP value may not always be changed. However, for convenience of description, the output of this step is referred to as QP' even if QP'=base QP.

A delta amount to be used to further adapt the value of QP' is then determined 504 based on the size of the TUs in the CU. In some embodiments, delta=0 for all TU sizes except the largest TU size, e.g., 32×32. In such embodiments, the value of delta for the largest TU size may be any suitable predetermined value. For example, the value of delta for the largest TU size may be empirically determined using a representative set of video sequences that the encoder is designed to encode. The value of delta for the largest TU size may be selected such that decreasing QP' for CUs with TUs of this largest size by delta suppresses discontinuities from neighboring CUs and thus decreases blocking artifacts caused by using this largest TU size.

In some embodiments, the value of delta may be non-zero for the largest TU size, and for one or more of the smaller TU sizes. The delta values for the smaller TU sizes are smaller than that of the largest TU sizes. For example, if the largest TU size is 32×32 and the next largest TU size is 16×16, the delta values for both the 32×32 TU size and the 16×16 TU size may be non-zero, with the delta value for the 16×16 TU size being smaller than that of the 32×32 TU size. In such embodiments, the value of delta for each of the TU sizes may be any suitable predetermined values. For example, the values of delta for each of the TU sizes may be empirically determined using a representative set of video sequences that the encoder is designed to encode.

QP' is then adapted 506 based on the value of delta to produce the final QP value, i.e., QP=QP'+delta. This final QP value is then use to quantize 508 the transform coefficients of the CU. In some embodiments, to avoid abrupt changes in the final QP, the value of the final QP is clipped to reduce the difference between the final QP and the QP of the previous CU. Let the QP of the previous CU be denoted as QPprev. The final QP may be clipped such that |QP−QPprev|≤d, i.e., if QP>QPprev+d, then QP is set to QPprev+d, and if QP<QPprev−d, QP is set to QPprev−d. Any suitable value of the distance d may be used.

Figure 6:
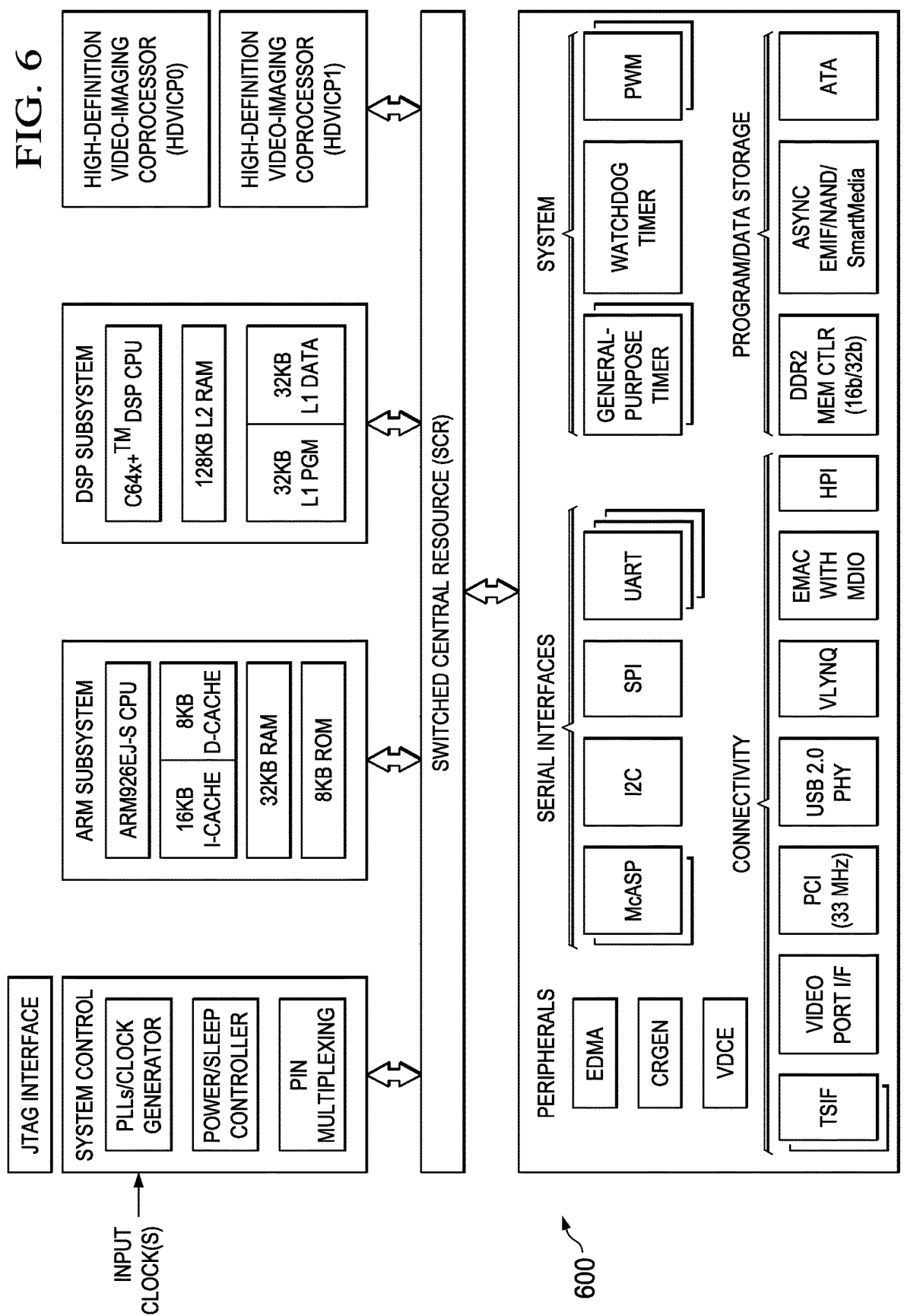
FIG. 6 is a block diagram of an illustrative digital system.

Embodiments of the methods and encoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, etc.). FIG. 6 is a block diagram of an example digital system suitable for use as an embedded system that may be configured to adapt (modulate) the base QPs of CUs based on activity (texture) in the CUs and based on the TU size used for the CUs as described herein during encoding of a video stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 600 is a programmable platform designed to meet the processing needs of applications such as video encode/decode/transcode/transrate, video surveillance, video conferencing, set-top box, medical imaging, media server, gaming, digital signage, etc. The SoC 600 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 600 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 600, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 600 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 6, the SoC 600 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, quantization, and in-loop filtering. Further, the distinct circuitry in the HDVICP coprocessors that may be used for specific computation operations is designed to operate in a pipeline fashion under the control of the ARM subsystem and/or the DSP subsystem.

As was previously mentioned, the SoC 600 may be configured to adapt (modulate) the base QPs of CUs based on activity (texture) in the CUs and based on the TU size used for the CUs as described herein during encoding of a video stream described herein during encoding of a video stream. For example, the coding control of the video encoder of FIG. 4 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
computing, by a video encoder, an activity measure for a block of pixels in a picture of a video, wherein the activity measure is representative of an amount of texture for the block of pixels;
adapting a first quantization parameter based on the activity measure to produce a second quantization parameter;
determining, by the video encoder, a delta value for the block of pixels based on a transform block size for the block of pixels, wherein one or more largest transform block sizes that are a subset of the transform block sizes of the picture of the video correspond to a non-zero delta value, and wherein transform block sizes other than the subset transform block sizes correspond to a zero delta value;
adjusting, by the video encoder, the second quantization parameter using the delta value for the block of pixels to produce a third quantization parameter; and
quantizing, by the video encoder, transform coefficients of the block of pixels using the third quantization parameter.

2. The method of claim 1, wherein a largest transform block size of the one more lamest transform block sizes of the picture of the video corresponds to the non-zero delta value, and wherein transform block sizes other than the largest transform block size correspond to the zero delta value.

3. The method of claim 2, wherein the largest transform block size is 32×32.

4. A video encoder comprising one or more processors, the one or more processors configured to:
compute an activity measure for a block of pixels in a picture of a video, wherein the activity measure is representative of an amount of texture for the block of pixels;
adapt a first quantization parameter based on the activity measure to produce a second quantization parameter;
determine a delta value for the block of pixels based on a transform block size for the block of pixels, wherein one or more largest transform block sizes that are a subset of the transform block sizes of the picture of the video correspond to a non-zero delta value, and wherein transform block sizes other than the subset transform block sizes correspond to a zero delta value;
adjust the second quantization parameter using the delta value for the block of pixels to produce a third quantization parameter; and
quantize transform coefficients of the block of pixels using the third quantization parameter.

5. The video encoder of claim 4, wherein a largest transform block size of the one more largest transform bock sizes of the picture of the video corresponds to the non-zero delta value, and wherein transform block sizes other than the largest transform block size correspond to the zero delta value.

6. The video encoder of claim 5, wherein the largest transform block size is 32×32.

7. A non-transitory computer readable medium storing instructions that, when executed by a processor in a video encoder, cause the processor to:
compute an activity measure for a block of pixels in a picture of a video, wherein the activity measure is representative of an amount of texture for the block of pixels;
adapt a first quantization parameter based on the activity measure to produce a second quantization parameter;
determine a delta value for the block of pixels based on a transform block size for the block of pixels, wherein one or more largest transform block sizes that are a subset of the transform block sizes of the picture of the video correspond to a non-zero delta value, and wherein transform block sizes other than the subset transform block sizes correspond to a zero delta value;
adjust the second quantization parameter using the delta value for the block of pixels to produce a third quantization parameter; and
quantize transform coefficients of the block of pixels using the third quantization parameter.

8. The non-transitory computer readable medium of claim 7, wherein a largest transform block size of the one more largest transform block sizes of the picture of the video corresponds to the non-zero delta value, and wherein transform block sizes other than the largest transform block size correspond to the zero delta value.

9. The non-transitory computer readable medium of claim 8, wherein the largest transform block size is 32×32.

* * * * *